United States Patent
Schmalz et al.

(10) Patent No.: US 10,666,036 B2
(45) Date of Patent: May 26, 2020

(54) ARC FAULT DETECTION SYSTEM

(71) Applicant: EATON CORPORATION, Cleveland, OH (US)

(72) Inventors: Steven Christopher Schmalz, Franklin, WI (US); Robert Kerth Davis, Pittsburgh, PA (US); Jason Kohei Arthur Okerman, Pittsburgh, PA (US); Sandy Omar Jimenez, Monaca, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 390 days.

(21) Appl. No.: 15/850,224

(22) Filed: Dec. 21, 2017

(65) Prior Publication Data
US 2019/0199080 A1     Jun. 27, 2019

(51) Int. Cl.
| | |
|---|---|
| H02H 1/00 | (2006.01) |
| H02H 3/10 | (2006.01) |
| H02H 3/26 | (2006.01) |
| F21V 8/00 | (2006.01) |
| G08C 19/12 | (2006.01) |
| G08C 23/04 | (2006.01) |

(52) U.S. Cl.
CPC .......... *H02H 1/0015* (2013.01); *H02H 3/105* (2013.01); *H02H 3/26* (2013.01); *G02B 6/0096* (2013.01); *G08C 19/12* (2013.01); *G08C 23/04* (2013.01)

(58) Field of Classification Search
CPC .......... H02H 1/0015; H02H 3/05; H02H 3/26; G02B 6/0096; G08C 19/12; G08C 23/04
USPC .......................................... 361/93.1
See application file for complete search history.

(56) References Cited

U.S. PATENT DOCUMENTS

| | | | |
|---|---|---|---|
| 5,223,795 | A | 6/1993 | Blades |
| 5,224,006 | A | 6/1993 | MacKenzie et al. |
| 5,434,509 | A | 7/1995 | Blades |
| 5,590,012 | A | 12/1996 | Dollar, II |
| 5,691,869 | A | 11/1997 | Engel et al. |
| 5,706,159 | A | 1/1998 | Dollar, II et al. |
| 5,729,145 | A | 3/1998 | Blades |
| 6,522,228 | B2 | 2/2003 | Wellner et al. |
| 6,522,509 | B1 | 2/2003 | Engel et al. |
| 6,542,056 | B2 | 4/2003 | Nerstrom et al. |
| 6,594,125 | B2 | 7/2003 | Dollar, II |

(Continued)

*Primary Examiner* — Kevin J Comber
(74) *Attorney, Agent, or Firm* — Eckert Seamans Cherin & Mellott, LLC

(57) ABSTRACT

An arc fault detection system includes a high frequency detector module structured to detect first spectral content of power having a frequency in a first frequency range, a number of arc fault circuit interrupters each having separable contacts, a low frequency detector module structured to detect second spectral content of power having a frequency in a second frequency range, a control unit structured to control the separable contacts to trip open, and an arc fault detection unit structured to detect an arc fault based on the detected first and second spectral content of the power and to cause the control unit to control the separable contacts to trip open in response to detecting the arc fault. A communication bus provides communication between the high frequency detector and the arc fault circuit interrupters and the first frequency range includes frequencies that are higher than frequencies in the second frequency range.

20 Claims, 5 Drawing Sheets

(56) References Cited

U.S. PATENT DOCUMENTS

| | | |
|---|---|---|
| 6,633,824 B2 | 10/2003 | Dollar, II |
| 6,710,688 B2 | 3/2004 | Wellner et al. |
| 6,987,389 B1 * | 1/2006 | Macbeth ............... H02H 1/0015 |
| | | 324/536 |
| 8,089,737 B2 | 1/2012 | Parker et al. |
| 2015/0204935 A1 * | 7/2015 | Klonowski .......... G01R 31/086 |
| | | 702/59 |
| 2017/0324236 A1 * | 11/2017 | Tomita ................. H02H 1/0015 |
| 2017/0343596 A1 * | 11/2017 | Misumi .............. G01R 31/1272 |

* cited by examiner

ARC FAULT DETECTION SYSTEM

BACKGROUND

Field

The disclosed concept relates generally to arc faults, and in particular, to systems for detecting arc faults.

Background Information

Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which heats and bends in response to a persistent overcurrent condition. The bimetal, in turn, unlatches a spring powered operating mechanism, which opens the separable contacts of the circuit breaker to interrupt current flow in the protected power system.

An arc fault circuit interrupter (AFCI) is a device intended to mitigate the effects of arc faults by functioning to deenergize an electrical circuit when an arc fault is detected. Non-limiting examples of AFCIs include: (1) arc fault circuit breakers; (2) branch/feeder arc fault circuit interrupters, which are intended to be installed at the origin of a branch circuit or feeder, such as a panelboard, and which may provide protection from series arc faults, ground faults and line-to-neutral faults up to the outlet; (3) outlet circuit arc fault circuit interrupters, which are intended to be installed at a branch circuit outlet, such as an outlet box, in order to provide protection of cord sets and power-supply cords connected to it (when provided with receptacle outlets) against the unwanted effects of arcing, and which may provide protection from series arc faults, line-to-ground faults and line-to-neutral faults; (4) cord arc fault circuit interrupters, which are intended to be connected to a receptacle outlet, in order to provide protection to an integral or separate power supply cord; (5) combination arc fault circuit interrupters, which function as either a branch/feeder or an outlet circuit AFCI; and (6) portable arc fault circuit interrupters, which are intended to be connected to a receptacle outlet and provided with one or more outlets.

During sporadic arc fault conditions, the overload capability of a conventional circuit breaker will not function since the root-mean-squared (RMS) value of the fault current is too small to activate the automatic magnetic trip circuit. The addition of electronic arc fault sensing to a circuit breaker can add one of the elements needed for sputtering arc fault protection—ideally, the output of an electronic arc fault sensing circuit directly trips and, thus, opens the circuit breaker. See, for example, U.S. Pat. Nos. 6,710,688; 6,542,056; 6,522,509; 6,522,228; 5,691,869; and 5,224,006.

An arc fault condition may be detected based on broadband spectral content (e.g., broadband noise) in power flowing through a circuit. U.S. Pat. No. 8,089,737 shows an AFCI that detects an arc fault condition by analyzing broadband noise. A typical load panel may include multiple AFCI's. The cost of an individual AFCI and the cost of an entire load panel are almost always concerns.

There is room for improvement in arc fault detection systems.

SUMMARY

These needs and others are met by embodiments of the disclosed concept in which an arc fault detection system a high frequency detector module shared among one or more arc fault circuit interrupters each having a low frequency detector module.

In accordance with one aspect of the disclosed concept, an arc fault detection system comprises: a high frequency detector module structured to receive power from a power source and to detect first spectral content of the power having a frequency in a first frequency range; a number of arc fault circuit interrupters each structured to receive power from the power source and having: separable contacts structured to trip open to stop power from flowing from the power source to a corresponding load; a low frequency detector module structured to detect second spectral content of the power having a frequency in a second frequency range; a control unit structured to control the separable contacts to trip open; an arc fault detection unit structured to detect an arc fault based on the detected first and second spectral content of the power and to cause the control unit to control the separable contacts to trip open in response to detecting the arc fault; and a communication bus structured to provide communication between the high frequency detector and the number of arc fault circuit interrupters, wherein the first frequency range includes frequencies that are higher than frequencies in the second frequency range.

In accordance with another aspect of the disclosed concept, an arc fault detection system comprises: a high frequency detector module structured to receive power from a power source and to detect first spectral content of the power having a frequency in a first frequency range; a number of arc fault circuit interrupters each structured to receive power from the power source and having: separable contacts structured to trip open to stop power from flowing from the power source to a corresponding load; a low frequency detector module structured to detect second spectral content of the power having a frequency in a second frequency range; and a control unit structured to control the separable contacts to trip open; an arc fault detection unit structured to detect an arc fault at a selected one of the number of arc fault circuit interrupters based on the detected first spectral content from the selected arc fault circuit interrupter and the second spectral content, wherein the arc fault detection unit is structured to output an instruction to trip to the selected arc fault circuit interrupter in response to detecting the arc fault at the selected arc fault circuit interrupter; and a communication bus structured to provide communication between the arc fault detection unit and the number of arc fault circuit interrupters, wherein the first frequency range includes frequencies that are higher than frequencies in the second frequency range, and wherein the instruction to trip causes the control unit of the selected arc fault circuit interrupter to trip open the separable contacts.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
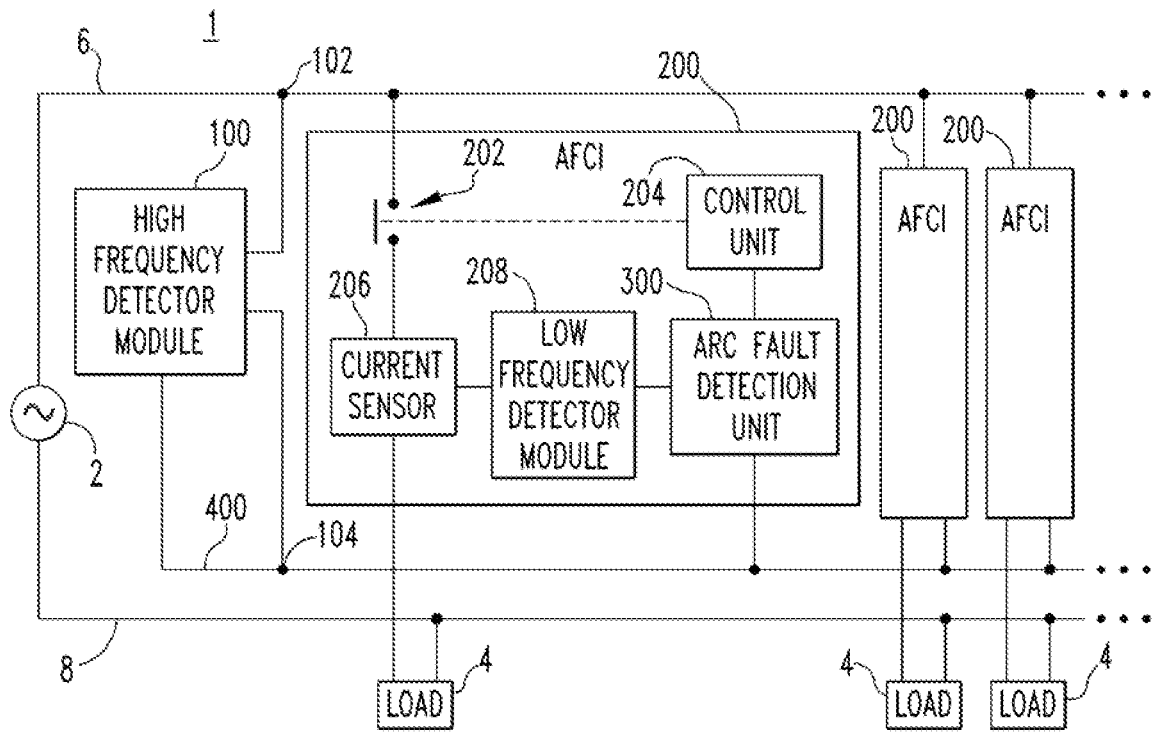
FIG. 1 is a schematic diagram of an arc fault detection system in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or more.

As employed herein, the term "processor" shall mean a programmable analog and/or digital device that can store, retrieve, and process data; a microprocessor; a microcontroller; a microcomputer; a central processing unit; or any suitable processing device or apparatus.

Sensing and analyzing electromagnetic spectral noise emission is a common method of detecting arc faults. See U.S. Pat. No. 8,089,737, the contents of which are incorporated in their entirety by reference. In order to accurately detect an arc fault based on electromagnetic spectral noise emission, broadband spectral content of the power flowing through the protected circuit should be monitored. The spectral content can be divided into high frequency spectral content (e.g., without limitation, above about 1 MHz) and low frequency spectral content (e.g., without limitation, below about 1 MHz).

The high frequency spectral content propagates more readily through a typical electrical distribution system than low frequency spectral content. For example, high frequency spectral content generated by an arc fault in one branch of an electrical system may propagate to and be detected in another branch of the electrical system while the low frequency spectral content generated by the arc fault may not propagate to another branch. In some example embodiments of the disclosed concept, arc fault detection systems advantageously use this property of high frequency spectral content to share a high frequency detector module between multiple AFCIs.

FIG. 1 is a schematic diagram of an arc fault detection system 1 in accordance with an example embodiment of the disclosed concept. The arc fault detection system 1 includes a high frequency detector module 100, a number of AFCIs 200, and a communication bus 400.

The AFCIs 200 are electrically coupled between a power source 2 and corresponding loads 4. The power source 2 provides AC power via line and neutral conductors 6,8.

The high frequency detector module 100 is structured to detect high frequency spectral content in the power from the power source 2. In some example embodiments of the disclosed concept, the high frequency spectral content may be spectral content having a frequency of 1 MHz or higher. For example and without limitation, the high frequency detector module 100 may filter out low frequency spectral content from the power so that only the high frequency spectral content remains. The high frequency detector module 100 may use any suitable components to detect the high frequency spectral content. For example and without limitation, it will be appreciated by those having ordinary skill in the art that the high frequency detector module 100 may use one or more of filters, tuned sensors, or other components to detect the high frequency spectral content. In the example embodiment shown in FIG. 1, the high frequency detector module 100 is structured to detect the high frequency spectral content based on the voltage of the power source 2. The high frequency detector module 100 is electrically connected to the line and neutral conductors 6,8 via connection points 102,104 to facilitate sensing the voltage of the power source 2.

The AFCIs 200 each include separable contacts 202, a control unit 204, a current sensor 206, a low frequency detector module 208, and an arc fault detection unit 300. The separable contacts 202 are electrically coupled between the line conductor 6 and the load 4 corresponding to the AFCI 200. The separable contacts 202 are structured to open to stop power from flowing from the power source 2 to the load 4. The separable contacts 202 may be electrical contacts that physically separate to sever an electrical connection. However, it will be appreciated by those having ordinary skill in the art that the separable contacts 202 may also be a solid-state switch, such as a transistor, that is structured to open (i.e., turn off) to sever an electrical connection.

The control unit 204 is structured to control the separable contacts 202 to open. The control unit 204 may include one or more electrical and/or physical devices such as, without limitation, a solenoid that actuates in response to an electrical signal to interact with a mechanical operating mechanism which responsively opens the separable contacts. However, it will be appreciated by those having ordinary skill in the art that any suitable components and arrangement of components capable of controlling the separable contacts to open may be employed in the control unit 204 without departing from the scope of the disclosed concept.

The low frequency detector module 208 is structured to detect low frequency spectral content of the power from the power source 2. In some example embodiments of the disclosed concept, the low frequency spectral content may be spectral content having a frequency of 1 MHz or lower. For example and without limitation, the low frequency detector module 208 may filter out low frequency spectral content from the power so that only the low frequency spectral content remains. The low frequency detector module 208 is coupled to a current sensor 206. The current sensor 206 is structured to sense current flowing from the line conductor 6 to the load 4. The low frequency detector module 208 is structured to detect the low frequency spectral content of the power based on the current sensed by the current sensor 206. The low frequency spectral content detected by the low frequency detector module 208 is detected at the location in the electrical system where the AFCI 200 is located (e.g., on the branch where the AFCI 200 is located). Since the low frequency spectral content of the power does not propagate through the system as well as the high frequency spectral content, the low frequency spectral content should be detected locally at each AFCI 200, while the high frequency spectral content may be detected at a centralized location such as the high frequency detection module 100.

The arc fault detection unit 300 is structured to detect an arc fault based on the high frequency spectral content detected by the high frequency detector module 100 and the low frequency spectral content detected by the low frequency detector module 208. The high frequency spectral content and the low frequency spectral content combined form broadband spectral content from which broadband noise can be detected and analyzed to detect an arc fault. For example and without limitation, the arc fault detection unit 300 may combine the high and low frequency spectral content to form broadband spectral content and then analyze the broadband spectral content in accordance the method described in U.S. Pat. No. 8,089,737, or using any other suitable method, to detect an arc fault based on the high and low frequency spectral content. In response to detecting an arc fault condition, the arc fault detection unit 300 may output a signal to the control unit 204 to cause the control unit 204 to control the separable contacts 202 to open.

The arc fault detection system 1 includes a communication bus 400 that is structured to provide communication between the high frequency detector module 100 and the number of AFCIs 200. For example, the communication bus 400 may communicate the high frequency spectral content, or other information such as an indication that an arc fault is potentially present based on an analysis of the high frequency spectral content, from the high frequency detector module 100 to the arc fault detection unit 300 of each of the AFCIs 200. The arc fault detection unit 300 may then combine the high frequency spectral content with the low frequency spectral content detected by its corresponding low frequency detector module 208 to detect an arc fault condition. In some example embodiments of the disclosed concept, the arc fault detection unit 300 may only receive an indication that an arc fault is potentially present based on an analysis of the high frequency spectral content by the high frequency detector module 100. In this case, the arc fault detection unit 300 does not combine the high and low frequency spectral content, but rather analyzes the low frequency spectral content and, based on the analysis of the low frequency spectral content and the indication that an arc fault is potentially present derived from the high frequency spectral content, makes the final determination of whether an arc fault is present. A suitable type of communication bus 400 capable of communicating the high frequency spectral content, or other information such an indication, from the high frequency detection module 100 to the AFCIs 200 may be employed. Some examples of communication busses in accordance with example embodiments of the disclosed concept will be descried herein.

By sharing the high frequency spectral content detected by the high frequency detector module 100 among multiple AFCIs 200, each AFCI 200 does not need to have the capability to detect high frequency spectral content. Thus, the components in each AFCI 200 are lowered and their cost is correspondingly lowered.

Figure 2:
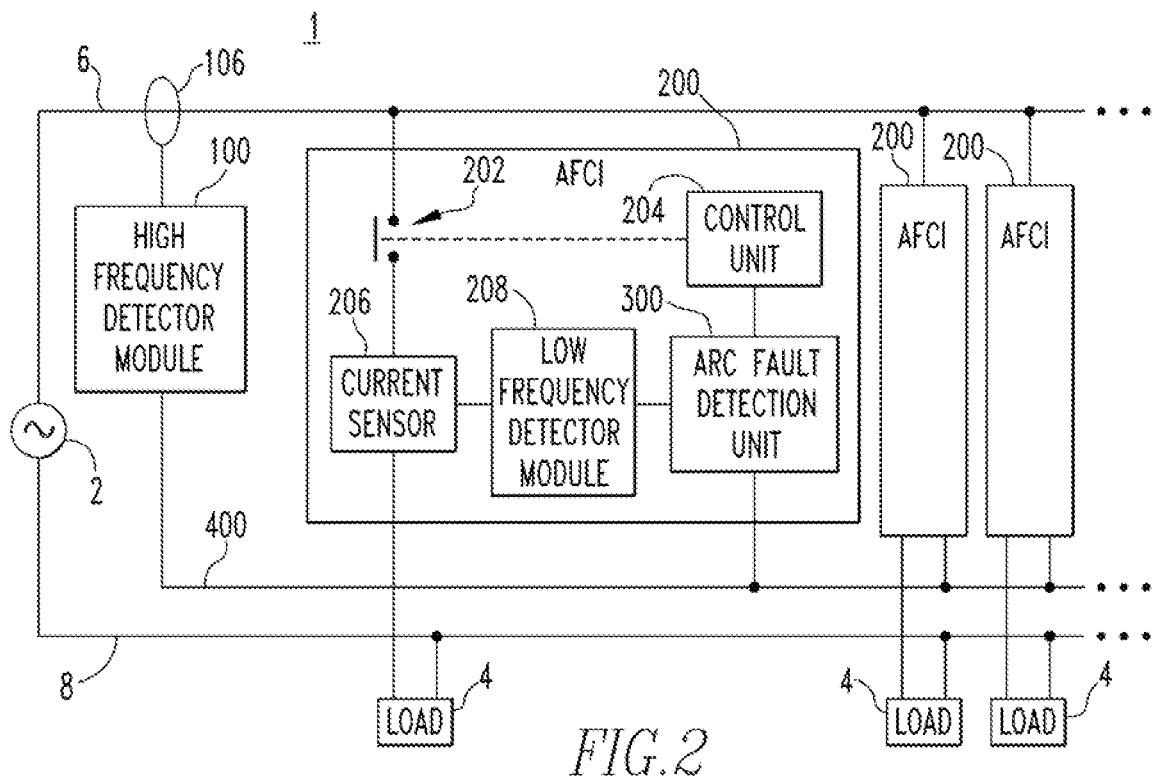
FIG. 2 is a schematic diagram of an arc fault detection system in accordance with another example embodiment of the disclosed concept.

FIG. 2 is a schematic diagram of an arc fault detection system 1 in accordance with another example embodiment of the disclosed concept. The arc fault detection system 1 of FIG. 2 only differs from the arc fault detection system 1 of FIG. 1 in that the high frequency detector module 100 in the arc fault detection system 1 of FIG. 2 detects the high frequency spectral content of the power from the power source 2 based on current, rather than voltage. A current sensor 106 is disposed around the line conductor 6 and is structured to sense current flowing through the line conductor 6. The current sensor 106 is coupled to the high frequency detector module 100 and the high frequency detector module is structured to detect the high frequency spectral content based on the sensed current from the current sensor 106.

Figure 3:
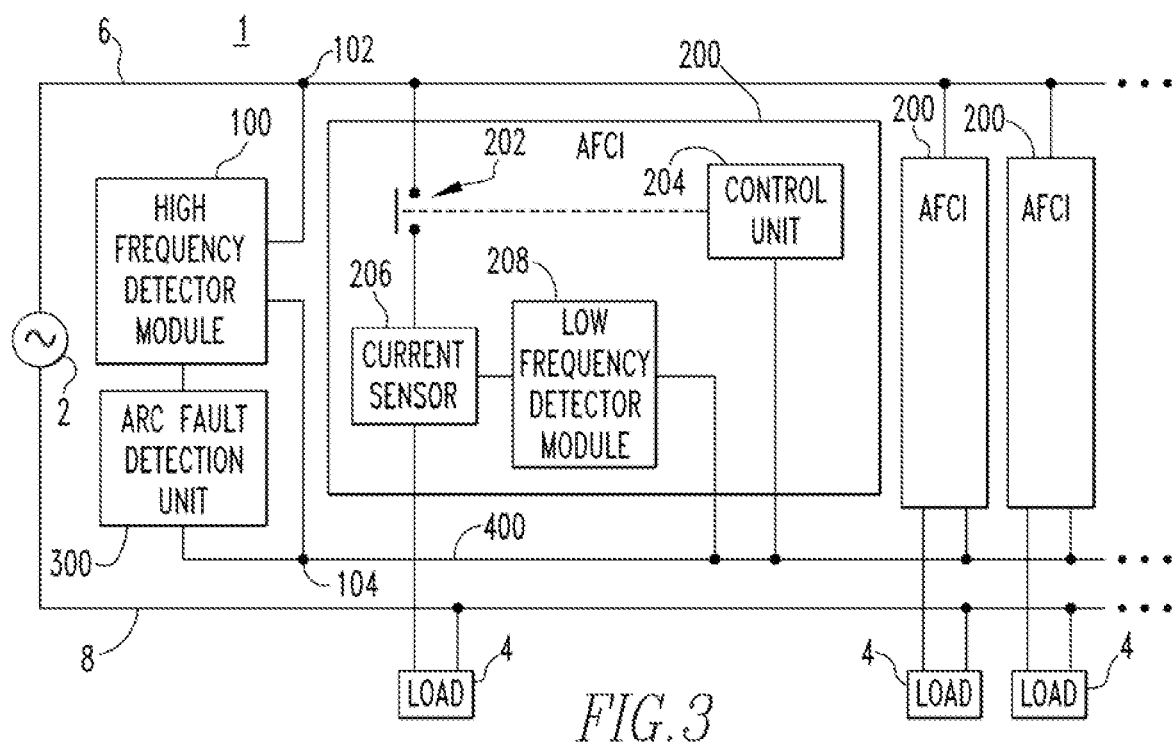
FIG. 3 is a schematic diagram of an arc fault detection system in accordance with another example embodiment of the disclosed concept.

FIG. 3 is a schematic diagram of an arc fault detection system 1 in accordance with another example embodiment of the disclosed concept. The arc fault detection system 1 of FIG. 3 is similar to the arc fault detection system 1 of FIG. 1. However, in the arc fault detection system 1 of FIG. 3, a single arc fault detection unit 300 is located outside the AFCIs 200 rather than the AFCIs 200 each including an arc fault detection unit 300.

In the example embodiment shown in FIG. 3, the arc fault detection unit 300 may be centrally located near or with the high frequency detector module 100. The arc fault detection unit 300 is coupled to the high frequency detector module 100 and is structured to receive the high frequency spectral content from the high frequency detector module 100. Also, in the example embodiment shown in FIG. 3, the communication bus 400 is structured to provide communication between the arc fault detection module 300 and the AFCIs 200. The communication bus 400 may communicate the low frequency spectral content detected by each of the low frequency detector modules 208 of the AFCIs 200 to the arc fault detection unit 300. The arc fault detection unit 300 determines whether an arc fault condition is present at a selected AFCI 200 based on the high frequency spectral content and the low frequency spectral content receive from the low frequency detector module 208 of the selected AFCI 200. In response to detecting an arc fault condition at a selected AFCI 200, the arc fault detector module 300 may send an instruction to trip to the selected AFCI 200 via the communication bus 400. The instruction to trip may be provided to the control unit 204 of the selected AFCI 200 and, in response to receiving the instruction to trip, the control unit 204 may control the separable contacts 202 to open.

While the example embodiment shown in FIG. 3 shows a high frequency detector module 100 that detects high frequency spectral content based on voltage, it will be appreciated by those having ordinary skill in the art that a high frequency detector module 100, such as the one shown in FIG. 2, that detects high frequency spectral content based on current may be employed without departing from the scope of the disclosed concept.

Figure 4:
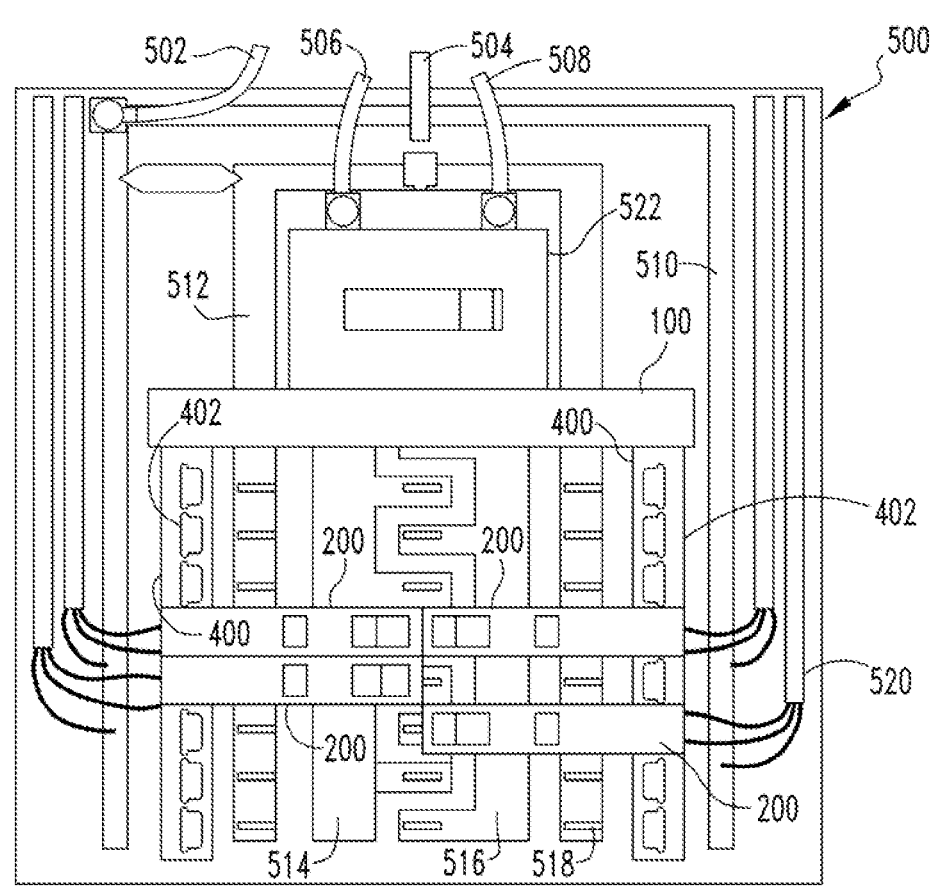
FIG. 4 is a schematic diagram of a load panel in accordance with an example embodiment of the disclosed concept.

In some example embodiments of the disclosed concept, the arc fault detection system 1 may be embodied in a load panel. FIG. 4 is a schematic diagram of an arc fault detection system 1 embodied in a load panel 500 in accordance with an example embodiment of the disclosed concept. The load panel 500 includes a ground connection 502, a neutral connection 504, a first line connection 506, and a second line connection 508. The neutral connection 504, the first line connection 506, and the second line connection 508 are structured to connect to a power source to provide power to the load panel 500 and the ground connection 502 is structured to connect to a ground of the electrical system. The load panel 500 also includes a ground bus 510, a neutral bus 512, a first line bus 514, and a second line bus 516. The ground bus 510, the neutral bus 512, the first line bus 514, and the second line bus 516 are connected to the ground connection 502, the neutral connection 504, the first line connection 506, and the second line connection 508, respectively. The load panel 500 also includes load wiring 520 that is used to electrically connect branch circuit breakers installed in the load panel 500 to their respective loads.

The load panel 500 includes a main circuit breaker 522. The load panel 500 also includes slots to receive a plurality of branch circuit breakers. Opening the main circuit breaker 522 interrupts power to any branch circuit breaker installed in the load panel 500 and their respective loads. The AFCIs 200 may comprise a portion or all of the branch circuit breakers installed in the load panel 500. Connectors 518 (e.g., without limitation, plug-on stabs) are disposed along the neutral bus 512 and the first and second line busses 514,516. When installed in the load panel 500, each of the AFCIs 200 may plug into a connector 518 on the neutral bus 512 and a connector 518 on one of the first and second line busses 514,516.

In the example embodiment shown in FIG. 4, the high frequency detector module 100 is a sidecar that is disposed proximate the main circuit breaker 100. The high frequency detector module 100 receives power from the first and second line connections 506,508 directly from the main circuit breaker 522 and is able to plug into the neutral bus 512. The high frequency detector module 100 may separately detect high frequency spectral content in the power that is provided to the first line bus 514 and the second line bus 516.

The communication bus 400 is disposed in the load panel 500 behind the high frequency detector module 100 and the AFCIs 200. The communication bus 400 extends down the load panel 500. When installed in the load panel 500, the AFCIs 200 may plug into the communication bus 400. In the example embodiment shown in FIG. 4, the communication bus 400 includes a number of electrical connections 402 into which the AFCIs 200 and the high frequency detector module 100 may be plugged into. The communication bus 400 is structured to provide communication between the high frequency detector module 100 and the AFCIs 200 via electrical communication. In the example embodiment of FIG. 4, the communication bus 400 may be, for example and without limitation, a multi-conductor cable, a flex circuit, a printed circuit board, or any other suitable structure or device capable of carrying an electrical signal from the high frequency detector module 100 to the AFCIs 200.

In the example embodiment shown in FIG. 4, the high frequency detector module 100 is shown as a sidecar proximate the main circuit breaker 522. In some example embodiments of the disclosed concept, the high frequency detector module 100 may be incorporated into the main circuit breaker 522.

In some example embodiments, the high frequency detector module 100 is structured to detect the high frequency spectral content using the voltage difference between the first line connector 506 (e.g., Line 1 voltage) and the second line connector 508 (e.g., Line 2 voltage). In these embodiments, the high frequency detector module 100 would communicate the detected high frequency spectral content with the AFCIs 200 connected to both the first and second line busses 514,516. In some other example embodiments, the high frequency detector module 100 is split into two high frequency detector modules 100, one to detect high frequency spectral content from the voltage between the first line connector 506 and the neutral connector and one to detect high frequency spectral content from the voltage between the second line connector 508 and the neutral connector 504. The high frequency detector module 100 corresponding to the first line connector 506 would then communicate with AFCIs 200 connected to the first line bus 514 and the high frequency detector module 100 corresponding to the second line connector 508 would then communicate with AFCIs 200 connected to the second line bus 518.

In some example embodiments of the disclosed concept, the high frequency detector 100 may detect characteristics in the high frequency spectral content that may indicate an arc fault condition. The high frequency detector module 100 may be structured to communicate the high frequency spectral content to the AFCIs 200 only when a characteristic potentially indicating an arc fault condition is detected in the high frequency spectral content. The arc fault detection units 300 in the AFCIs 200 may then combine the high frequency spectral content with their own detected low frequency spectral content to make the final determination of whether an arc fault condition is present and determine whether a trip is needed.

Also, in some example embodiments of the disclosed concept, the high frequency detector 100 may communicate an indication that a characteristic potentially indicating an arc fault condition is detected in the high frequency spectral content to the AFCIs 200 via the communication bus 400 rather than communicating the high frequency spectral content itself. In some example embodiments of the disclosed concept, the indication may be a simple indication, but it will be appreciated by those having ordinary skill the art that additional information such as, without limitation, the intensity of the high frequency spectral content may be communicated to the AFCIs 200. The arc fault detection units 300 of the AFCIs 200 may then analyze the low frequency spectral content to make the final determination of whether an arc fault condition is present and determine whether a trip is needed. In example embodiments where an indication or information other than the high frequency spectral content itself is sent to the AFCis 200, the arc fault detection units 300 do not combine the low frequency spectral content with the high frequency spectral content. Rather, an indication that a characteristic potentially indicating an arc fault condition is present in the high frequency spectral content combined with a separate analysis of the low frequency spectral content can be sufficient to make a determination of whether an arc fault condition is present and whether a trip is needed.

Figure 5:
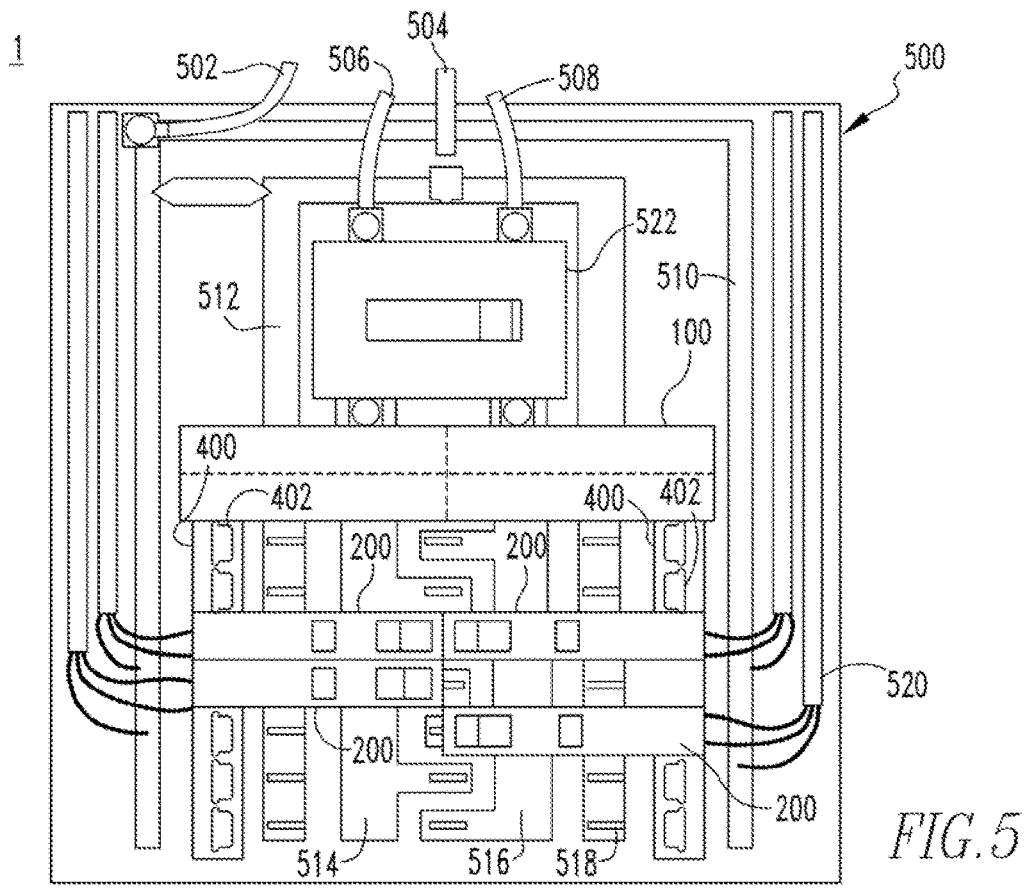
FIG. 5 is a schematic diagram of a load panel in accordance with another example embodiment of the disclosed concept.

FIG. 5 is a schematic diagram of an arc fault detection system 1 embodied in a load panel 500 in accordance with an example embodiment of the disclosed concept. The example embodiment shown in FIG. 5 is similar to the example embodiment shown in FIG. 4. However, in the example embodiment shown in FIG. 5, the high frequency detector module 100 spans four slots in the load panel 500 and is structured to plug into the first and second line busses 514,516, rather than being directly connected to the main circuit breaker 522 as a sidecar. By plugging into the first and second line busses 514,516, the high frequency detector module 100 is able to separately detect high frequency spectral content in the power flowing through the first line bus 514 and the second line bus 516. The high frequency detector module 100 uses four slots and spans across two rows of the slots. The rows of slots alternate between connecting the first line bus 514 and the second line bus 516. By spanning two rows, the high frequency detector module 100 is able to connect to both the first and second line busses 514,516.

Figure 6:
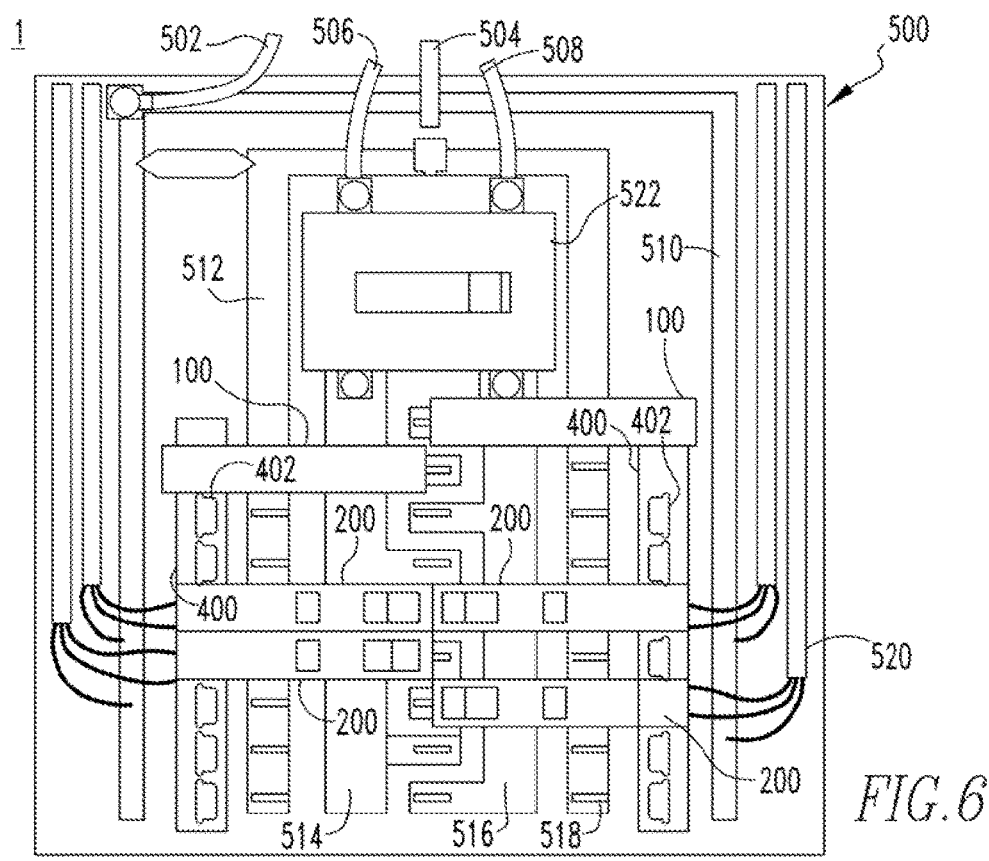
FIG. 6 is a schematic diagram of a load panel in accordance with another example embodiment of the disclosed concept.

FIG. 6 is a schematic diagram of an arc fault detection system 1 embodied in a load panel 500 in accordance with an example embodiment of the disclosed concept. The example embodiment shown in FIG. 6 is similar to the example embodiment shown in FIG. 5. However, in the example embodiment shown in FIG. 6, the high frequency detector module 100 is split into two high frequency detector modules 100, one of which is connected to the first line bus 514 and one of which is connected to the second line bus 516. Each high frequency detector module 100 communicates with the AFCIs 200 that are one the same line bus that it is.

Figure 7:
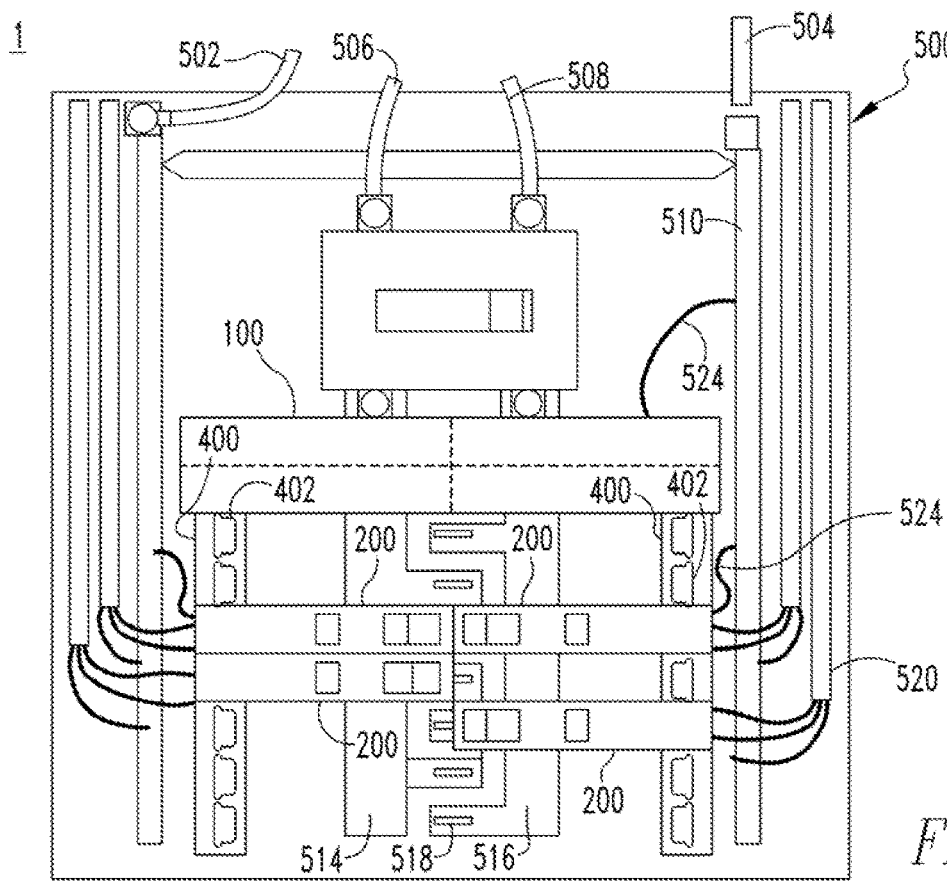
FIG. 7 is a schematic diagram of a load panel in accordance with another example embodiment of the disclosed concept.

FIG. 7 is a schematic diagram of an arc fault detection system 1 embodied in a load panel 500 in accordance with an example embodiment of the disclosed concept. The example embodiment shown in FIG. 7 is similar to the example embodiment shown in FIG. 4. However, in the example embodiment shown in FIG. 7, pigtail connectors 524 are used instead of a neutral bus. The pigtail connectors 524 connect to the ground bus 510, which is tied to the neutral connection 504.

Figure 8:
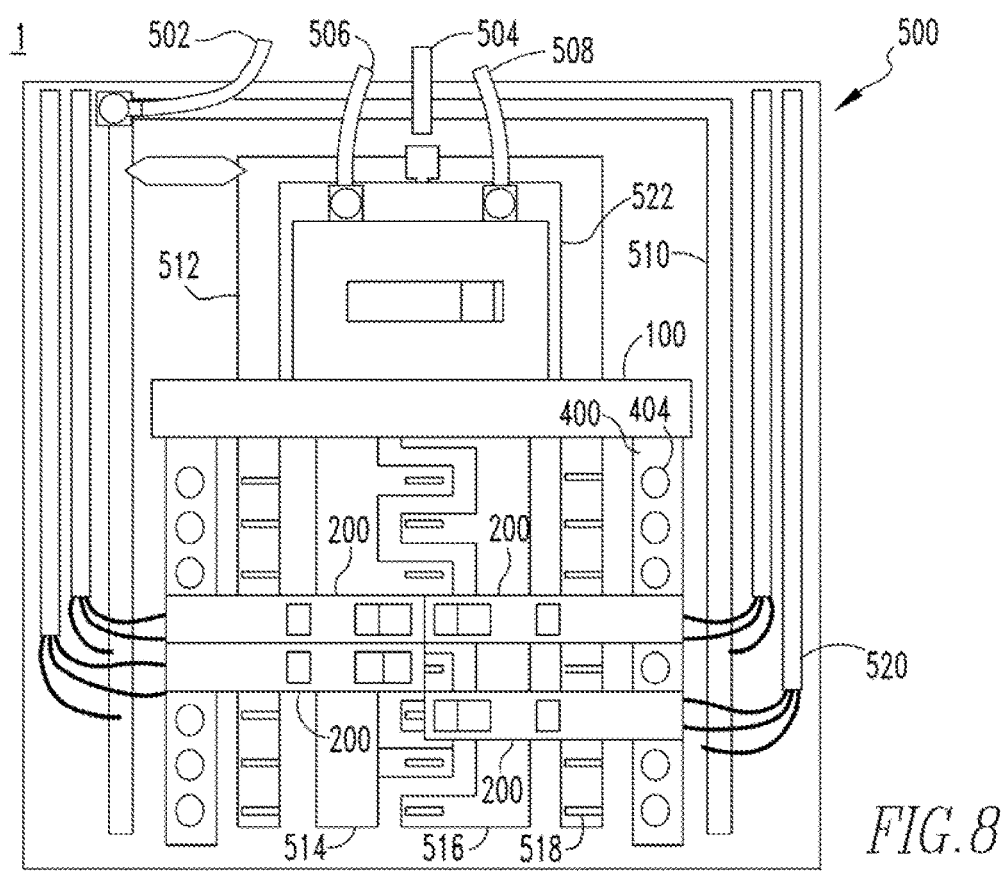
FIG. 8 is a schematic diagram of a load panel in accordance with another example embodiment of the disclosed concept.

FIG. 8 is a schematic diagram of an arc fault detection system embodied in a load panel 500 in accordance with an example embodiment of the disclosed concept. The example embodiment shown in FIG. 8 is similar to the example embodiment shown in FIG. 4. However, in the example embodiment shown in FIG. 8, the communication bus 400 is structured to communicate between the high frequency detector module 100 and the AFCIs 200 using light as a communication medium. For example, the communication bus 400 includes a number of light emitters 404 such as light emitting diodes. The AFCIs 200 may each have photo sensors that align with one of the light emitters 404 such that the photo sensor can sense when the light emitter 404 lights up. The light emitters 404 may light up in encoded patterns to communicate information, such as the high frequency spectral content to the AFCIs 200.

The high frequency detector module 100 is connected to the communication bus 400 and may control the communication bus 400 to light up selected light emitters 404 to communicated with the AFCIs 200. In some example embodiments, communication from the high frequency detector module 100 to the AFCIs 200 is one way. However, in some other example embodiments, the communication may be two-way. For example, the communication bus 400 may include photo sensor in addition to the light emitters 404 and the AFCIs 200 may additionally include their own light emitters. The AFCIs 200 may light up their own light emitters in encoded patterns that may be sensed by the photo sensors of the communication bus 400. The communication bus 400 may then carry the communicated information back to the high frequency detector module 100.

Figure 9:
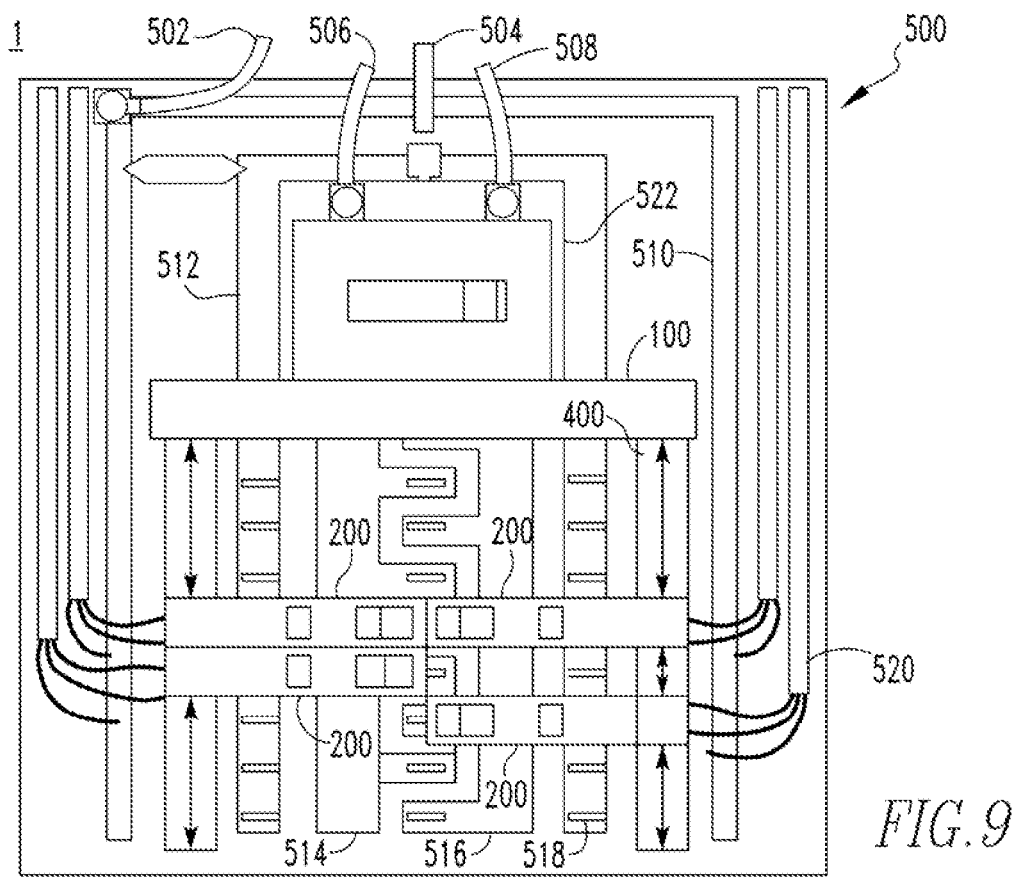
FIG. 9 is a schematic diagram of a load panel in accordance with another example embodiment of the disclosed concept.

FIG. 9 is a schematic diagram of an arc fault detection system 1 embodied in a load panel 500 in accordance with an example embodiment of the disclosed concept. The example embodiment of FIG. 9 is similar to the example embodiment of FIG. 8. However, in the example embodiment of FIG. 9, the communication bus 400 is a light pipe.

In this example embodiment, the high frequency detector module 100 is structured to apply light signals to the communication bus 400. The communication bus 400 then carries the light signals to corresponding AFCIs 200. The AFCIs 200 each include photo sensors to sense the light signals. The light signals may be encoded patterns that may carry information such as the high frequency spectral content.

Figure 10:
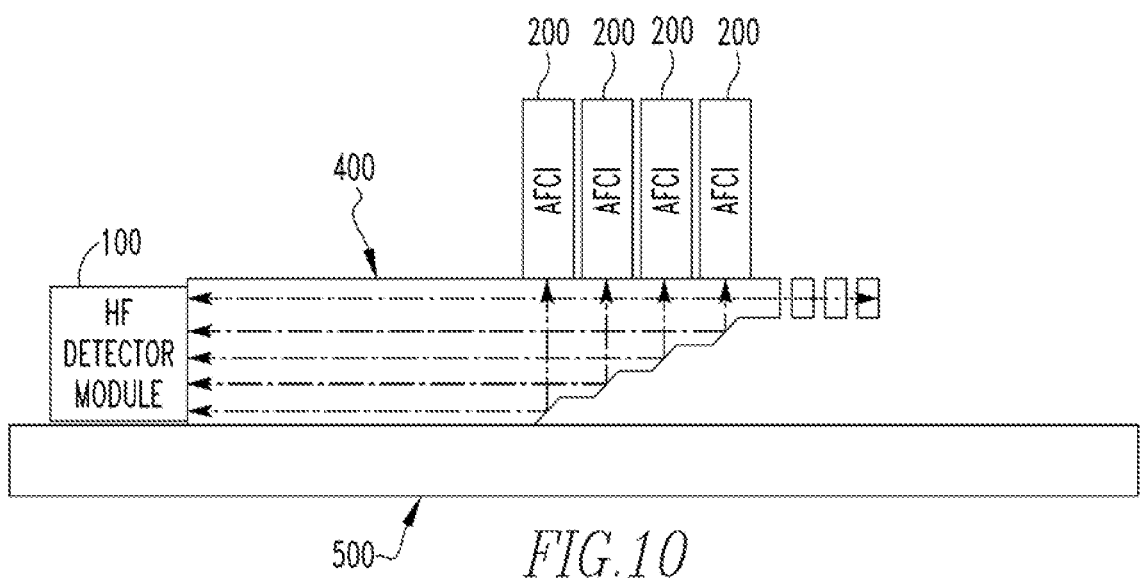
FIG. 10 is a schematic diagram of a communication bus in accordance with an example embodiment of the disclosed concept.

FIG. 10 shows an example of a light pipe used as the communication bus 400 in accordance with an example embodiment of the disclosed concept. As shown in FIG. 10, the high frequency detector module 100 applies light signals across the height of the communication bus 400. The communication bus 400 includes an angled section at each of the AFCIs 200. Each angled section redirects one of the light signals to a corresponding AFCI 200. In this manner, the communication bus 400 may provide a light signal to a specific AFCI 200.

It will be appreciated by those having ordinary skill in the art that various components described herein may include or be embodied in a processor. For example and without limitation, the arc fault detection unit 300, the low frequency detector module 208, and the control unit 204 may be embodied in or include one or more processors. The high frequency detector module 100 may also be embodied in or include one or more processors.

It will be appreciated by those having ordinary skill in the art that components from the disclosed example embodiments may be replaced with components from other example embodiments without departing from the scope of the disclosed concept. Components from one or more example embodiments may be added to another example embodiment without departing from the scope of the disclosed concept. Furthermore, some components may be removed from an example embodiment without departing from the scope of the disclosed concept.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An arc fault detection system comprising:
   a high frequency detector module structured to receive power from a power source and to detect first spectral content of the power having a frequency in a first frequency range;
   a number of arc fault circuit interrupters each structured to receive power from the power source and having:
     separable contacts structured to trip open to stop power from flowing from the power source to a corresponding load;
     a low frequency detector module structured to detect second spectral content of the power having a frequency in a second frequency range;
     a control unit structured to control the separable contacts to trip open;
     an arc fault detection unit structured to detect an arc fault based on the detected first and second spectral content of the power and to cause the control unit to control the separable contacts to trip open in response to detecting the arc fault; and a communication bus structured to provide communication between the high frequency detector module and the number of arc fault circuit interrupters, wherein the first frequency range includes frequencies that are higher than frequencies in the second frequency range;

wherein the number of arc fault circuit interrupters is greater than one.

2. The arc fault detection system of claim 1, wherein the first frequency range includes frequencies above about 1 MHz and the second frequency range includes frequencies below about 1 MHz.

3. The arc fault detection system of claim 1, wherein the high frequency detector is structured to detect a voltage of the power and to detect the first spectral content based on the voltage of the power.

4. The arc fault detection system of claim 1, wherein the high frequency detector is structured to detect a current of the power and to detect the first spectral content based on the current of the power.

5. The arc fault detection system of claim 1, further comprising:
a load panel including a main circuit breaker and a number of branch circuit breakers, wherein the number of branch circuit breakers include the number of arc fault circuit interrupters.

6. The arc fault detection system of claim 5, wherein the main circuit breaker includes the high frequency detector module.

7. The arc fault detection system of claim 5, wherein the load panel includes a first power bus, a second power bus, and a neutral bus; wherein the number of arc fault circuit interrupters include a first number of arc fault circuit interrupters electrically connected to the first power bus and a second number of arc fault circuit interrupters electrically connected to the second power bus.

8. The arc fault detection system of claim 7, wherein the high frequency detector module is structured to detect the first spectral content using a voltage difference between the first power bus and the second power bus.

9. The arc fault detection system of claim 7, wherein the high frequency detector module is a first high frequency detector module structured to detect the first spectral content using a voltage difference between the first power bus and the neutral bus and a second high frequency detector module structured to detect the first spectral content using a voltage difference between the second power bus and the neutral bus; and wherein the first high frequency detector module is structured to communicate the first spectral content to the first number of arc fault circuit interrupters and the second high frequency detector module is structured to communicate the first spectral content to the second number of arc fault circuit interrupters.

10. The arc fault detection system of claim 7, wherein the communication bus and the first and second power busses are disposed behind the number of arc fault circuit interrupters in the load panel.

11. The arc fault detection system of claim 1, wherein the communication bus is structured to provide communication between the high frequency detector and the number of arc fault circuit interrupters using electrical signals.

12. The arc fault detection system of claim 11, wherein the communication bus includes a number of electrical connectors; and wherein the number of arc fault circuit interrupters are structured to plug into corresponding ones of the electrical connectors.

13. The arc fault detection system of claim 1, wherein the communication bus is structured to provide communication between the high frequency detector and the number of arc fault circuit interrupters using light.

14. The arc fault detection system of claim 13, wherein the communication bus includes a number of light emitters; and wherein the number of arc fault circuit interrupters each include a photo sensor structured to sense an output of a corresponding light emitter.

15. The arc fault detection system of claim 13, wherein the communication bus is a light pipe structured to carry light signals from the high frequency detector module to the number of arc fault circuit interrupters; and wherein the number of arc fault circuit interrupters each include a photo sensor structured to sense the light signals.

16. The arc fault detection system of claim 15, wherein the light pipe includes a number of angled sections each structured redirect a selected light signal to a selected one of the number of arc fault circuit interrupters.

17. The arc fault detection system of claim 1, wherein the communication bus is structured to provide one-way communication from the high frequency detector module to the number of arc fault circuit interrupters.

18. The arc fault detection system of claim 1, wherein the communication bus is structured to provide two-way communication between the high frequency detector module and the number of arc fault circuit interrupters.

19. The arc fault detection system of claim 1, wherein the high frequency detector module is structured sense a characteristic in the first spectral content and, in response to sensing the characteristic, to communicate the first spectral content to the number of arc fault circuit interrupters via the communication bus; and wherein, in response to receiving the first spectral content, the arc fault detection units of the number of arc fault circuit interrupters are structured to determine whether an arc fault the present based on the detected first and second spectral content.

20. An arc fault detection system comprising:
a high frequency detector module structured to receive power from a power source and to detect first spectral content of the power having a frequency in a first frequency range;
a number of arc fault circuit interrupters each structured to receive power from the power source and having:
separable contacts structured to trip open to stop power from flowing from the power source to a corresponding load;
a low frequency detector module structured to detect second spectral content of the power having a frequency in a second frequency range; and
a control unit structured to control the separable contacts to trip open;
an arc fault detection unit structured to detect an arc fault at a selected one of the number of arc fault circuit interrupters based on the detected first spectral content from the selected arc fault circuit interrupter and the second spectral content, wherein the arc fault detection unit is structured to output an instruction to trip to the selected arc fault circuit interrupter in response to detecting the arc fault at the selected arc fault circuit interrupter; and
a communication bus structured to provide communication between the arc fault detection unit and the number of arc fault circuit interrupters,
wherein the first frequency range includes frequencies that are higher than frequencies in the second frequency range, wherein the instruction to trip causes the control unit of the selected arc fault circuit interrupter to trip open the separable contacts; and wherein the number of arc fault circuit interrupters is greater than one.

\* \* \* \* \*